United States Patent
Lokare et al.

(10) Patent No.: US 10,311,368 B2
(45) Date of Patent: Jun. 4, 2019

(54) ANALYTIC SYSTEM FOR GRAPHICAL INTERPRETABILITY OF AND IMPROVEMENT OF MACHINE LEARNING MODELS

(71) Applicant: SAS Institute Inc., Cary, NC (US)

(72) Inventors: Namita Dilip Lokare, Cary, NC (US); Jorge Manuel Gomes da Silva, Durham, NC (US); Ilknur Kaynar Kabul, Apex, NC (US); Gregory Naisat, Chicago, IL (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/928,363

(22) Filed: Mar. 22, 2018

(65) Prior Publication Data

US 2019/0080253 A1    Mar. 14, 2019

Related U.S. Application Data

(60) Provisional application No. 62/557,657, filed on Sep. 12, 2017.

(51) Int. Cl.
*G06N 7/00* (2006.01)
*G06N 20/00* (2019.01)

(52) U.S. Cl.
CPC ............. *G06N 7/005* (2013.01); *G06N 20/00* (2019.01)

(58) Field of Classification Search
CPC ...... G06N 99/005; G06N 5/025; G06N 7/005; G06K 9/6256; G06K 9/6269

(Continued)

(56) References Cited

U.S. PATENT DOCUMENTS

| 7,574,409 | B2 * | 8/2009 | Patinkin | G06Q 10/107 706/12 |
| 8,533,224 | B2 * | 9/2013 | Lin | G06N 3/08 707/771 |

(Continued)

OTHER PUBLICATIONS

Eva Sinar—"7 Data Visualization Types You Should be Using More (and How to Start)"—2016—https://medium.com/@EvanSinar/7-data-visualization-types-you-should-be-using-more-and-how-to-start-4015b5d4adf2 (Year: 2016).*

(Continued)

*Primary Examiner* — Scott A. Waldron
*Assistant Examiner* — Viker A Lamardo
(74) *Attorney, Agent, or Firm* — Bell & Manning, LLC

(57) ABSTRACT

A computing device provides a cluster connectivity graph presented on a display to summarize machine learning model performance. A classification value is predicted is predicted for a response variable value of each observation vector using a trained model. Observation vectors are divided into overlapping data slices that are separately clustered using the predicted classification value to define a set of clusters. A number of observations in each cluster is computed. An accuracy measure is computed for each cluster based on the predicted classification value. A number of overlapping observations between each pair of clusters is computed. The cluster connectivity graph includes a node for each cluster. A size of each node is determined from the computed number of observations. A fill-pattern of each node is determined from the computed accuracy measure. A connector line between each pair of nodes is determined from the computed number of overlapping observations.

30 Claims, 13 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 8,823,709 | B2* | 9/2014 | Grandhi | G06F 17/30994 345/440 |
| 2004/0071338 | A1* | 4/2004 | Nefian | G06K 9/00288 382/159 |
| 2004/0131259 | A1* | 7/2004 | Nefian | G06K 9/6296 382/228 |
| 2012/0185275 | A1* | 7/2012 | Loghmani | G06F 19/328 705/3 |
| 2012/0245481 | A1* | 9/2012 | Blanco | A61B 5/048 600/544 |
| 2013/0282393 | A1* | 10/2013 | Ebadollahi | G06Q 10/10 705/2 |
| 2014/0089287 | A1* | 3/2014 | Connolly | G06F 17/30991 707/707 |
| 2015/0127327 | A1* | 5/2015 | Bacchiani | G10L 25/30 704/202 |
| 2015/0154320 | A1* | 6/2015 | Umetani | B29C 67/0092 703/1 |
| 2015/0332156 | A1* | 11/2015 | Pliner | G06Q 30/00 706/52 |
| 2015/0363361 | A1* | 12/2015 | Kniazev | G05B 23/0224 703/2 |
| 2015/0371115 | A1* | 12/2015 | Marchisio | G06K 9/6269 382/159 |
| 2015/0379429 | A1* | 12/2015 | Lee | G06N 99/005 706/11 |
| 2015/0379430 | A1* | 12/2015 | Dirac | G06N 99/005 706/12 |
| 2016/0196587 | A1* | 7/2016 | Eder | G06Q 30/00 705/14.49 |
| 2016/0267166 | A1* | 9/2016 | Kohlmeier | G06F 17/30312 |
| 2017/0159045 | A1* | 6/2017 | Serber | C12N 15/1058 |
| 2018/0018590 | A1* | 1/2018 | Szeto | G06F 19/00 |
| 2018/0081862 | A1* | 3/2018 | Zhao | G06F 17/30958 |
| 2018/0157794 | A1* | 6/2018 | Fusi | G06F 19/24 |

OTHER PUBLICATIONS

Janis Gulbis—"Data Visualization—How to Pick the Right Chart Type?"—2016—https://eazybi.com/blog/data_visualization_and_chart_types/ (Year: 2016).*

Kogan et al.—"Grouping Multidimensional Data Recent Advances in Clustering"—2006 (Year: 2006).*

Venkatesh Boddapati—Classifying Environmental Sounds with Image Networks—2017—https://pdfs.semanticscholar.org/09c2/f123e5f329f4143becad27075d7f8d8ee4d2.pdf (Year: 2017).*

Yeh et al., The comparisons of data mining techniques for the predictive accuracy of probability of default of credit card clients, Expert Systems with Applications 36 (2009) pp. 2473-2480.

Baryshnikov et al., Target enumeration via euler characteristic integrals, Siam Journal on Applied Mathematics, vol. 70, issue 3, Jan. 1, 2009.

G. Carlsson, Topology and Data, American Mathematical Society, vol. 46, No. 2, Apr. 2009, pp. 255-308.

Ribeiro et al., "Why Should I Trust You?" Explaining the Predictions of Any Classifier, Knowledge Discovery and Data Mining, San Francisco, CA, Aug. 2016.

Niyogi et al., Finding the homology of submanifolds with high confidence from random samples, Mar. 2008.

H. Sexton, Topological Analysis and Machine Learning: Friends or Enemies?, https://www.kdnuggets.com/2015/09/ayasdi-topological-analysis-machine-learning.html, Sep. 2015.

A. Zomorodian, Topology for Computing, 2005.

Zeiler et al., Visualizing and Understanding Convolutional Networks, arXiv:1311.2901v3, Nov. 28, 2013.

Calinski et al., A Dendrite Method for Cluster Analysis, Communications in Statistics 3(1), 1974, pp. 1-27.

Keshavan et al., Matrix Completion from a Few Entries, arXiv:0901.3150v4, Sep. 17, 2009.

Singh et al., Topological Methods for the Analysis of High Dimensional Data Sets and 3D Object Recognition, Eurographics Symposium on Point-Based Graphics, 2007.

P. Rousseeuw, Silhouettes: a graphical aid to the interpretation and validation of cluster analysis, Journal of Computational and Applied Mathematics 20, 1987, pp. 53-65.

Ribeiro et al., Introduction to Local Interpretable Model-Agnostic Explanations (LIME), https://www.oreilly.com/learning/introduction-to-local-interpretable-model-agnostic-explanations-lime, Aug. 12, 2016.

GitHub—MLWave/kepler-mapper, https//github.com/MLWave/kepler-mapper, Available Nov. 17, 2017.

G. Clark, Representing Data with Graphs, CS594-presentation, Mar. 12, 2014.

* cited by examiner

ANALYTIC SYSTEM FOR GRAPHICAL INTERPRETABILITY OF AND IMPROVEMENT OF MACHINE LEARNING MODELS

CROSS-REFERENCE TO RELATED APPLICATIONS

The present application claims the benefit of 35 U.S.C. § 111(e) to U.S. Provisional Patent Application No. 62/557,657 filed on Sep. 12, 2017, the entire contents of which are hereby incorporated by reference.

BACKGROUND

The growing widespread adoption of machine learning solutions in many industries and for many different types of analysis demands a universal, fast, and easy to use and understand system for model diagnostics that supports both novice and expert users. For example, despite the extraordinary success of using trained deep neural networks to model system behavior, there is a lack of a theoretical understanding of how a neural network is able to learn complicated patterns while generalizing and performing well on new data. The trained deep neural network acts as a black box tool whose properties are not well understood. High dimensionality of the parameter space and the input prevents effective visualization of the operation of the neural network. As a result, professionals and non-experts in the field both struggle to find a way to analyze operation of a given neural network model and to understand the drawbacks and the weaknesses in the given trained model. When a neural network model fails to perform as expected, the user finds it difficult to determine what caused the degraded performance and how to correct it.

SUMMARY

In an example embodiment, a non-transitory computer-readable medium is provided having stored thereon computer-readable instructions that, when executed by a computing device, cause the computing device to provide a visualization that summarizes a performance of a machine learning model to support model improvement and understanding. A dataset is read that includes a plurality of observation vectors. Each observation vector of the plurality of observation vectors includes an explanatory variable value for an explanatory variable and a response variable value for a response variable. A model is trained using the plurality of observation vectors. A classification value is predicted for the response variable for each observation vector of the plurality of observation vectors using a respective explanatory variable value input to the trained model. The plurality of observation vectors is divided into a plurality of overlapping data slices. Each data slice of the plurality of overlapping data slices is separately clustered using the predicted classification value to define a set of clusters for the plurality of observation vectors. A number of observations is computed in each cluster of the set of clusters. An accuracy measure is computed for each cluster of the set of clusters based on a comparison between the predicted classification value and a respective response variable value of each observation vector of the plurality of observation vectors. A number of overlapping observations between each pair of clusters of the set of clusters is computed. A cluster connectivity graph is presented on a display. The cluster connectivity graph includes a node for each cluster of the set of clusters. A size of each node is determined from the computed number of observations. A fill-pattern of each node is determined from the computed accuracy measure. A connector line between each pair of nodes is determined from the computed number of overlapping observations.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide a visualization that summarizes a performance of a machine learning model to support model improvement and understanding.

In yet another example embodiment, a method provides a visualization that summarizes a performance of a machine learning model to support model improvement and understanding.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
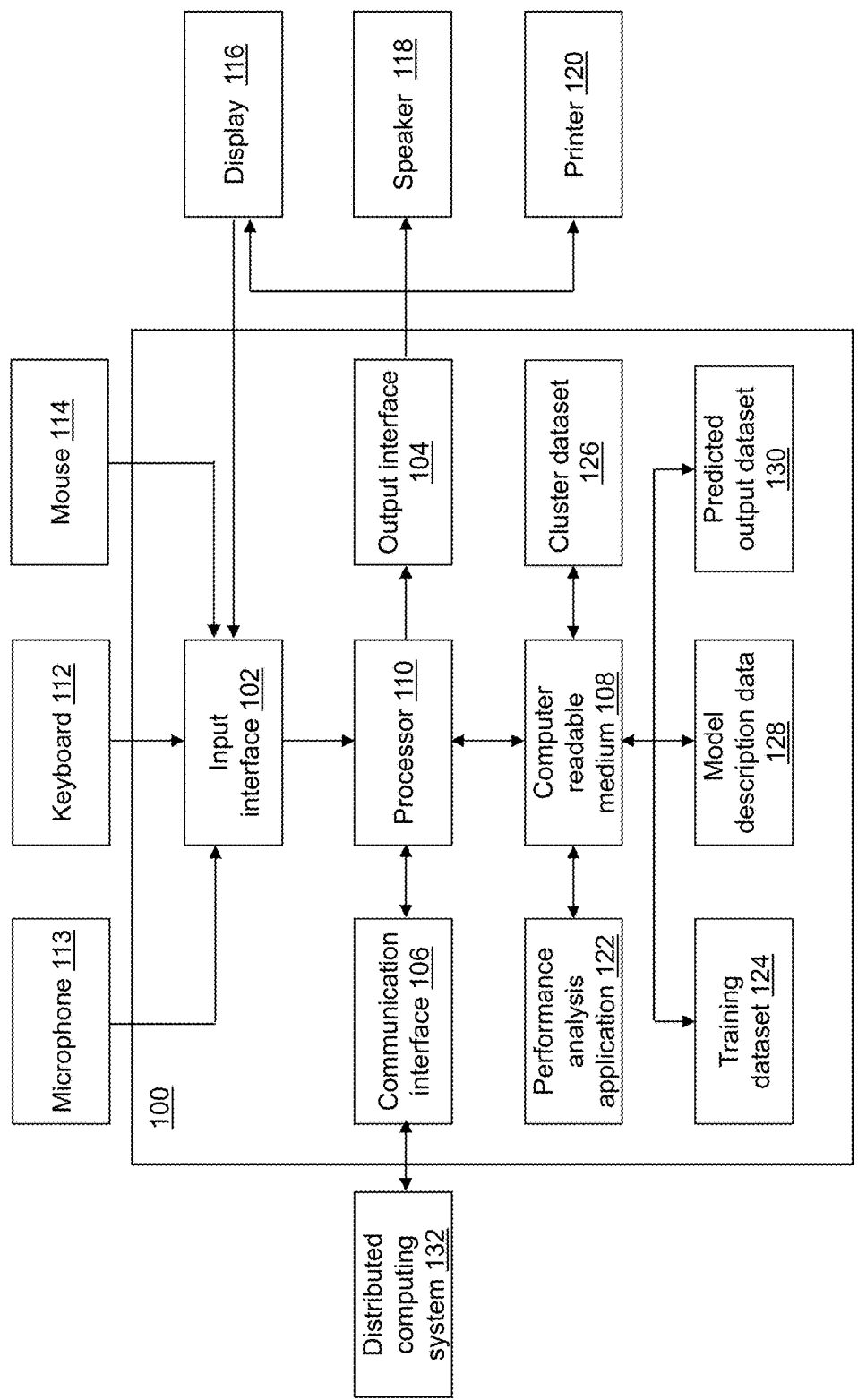
FIG. 1 depicts a block diagram of a performance analysis device in accordance with an illustrative embodiment.

Referring to FIG. 1, a block diagram of a performance analysis device 100 is shown in accordance with an illustrative embodiment. Performance analysis device 100 provides interactive model understanding and performance improvement. Performance analysis device 100 may include an input interface 102, an output interface 104, a communication interface 106, a non-transitory computer-readable medium 108, a processor 110, a performance analysis application 122, a training dataset 124, a cluster dataset 126, a model description data 128, and a predicted output dataset 130. Fewer, different, and/or additional components may be incorporated into performance analysis device 100.

Input interface 102 provides an interface for receiving information from the user or another device for entry into performance analysis device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into performance analysis device 100 or to make selections presented in a user interface displayed on display 116.

The same interface may support both input interface 102 and output interface 104. For example, display 116 comprising a touch screen provides a mechanism for user input and for presentation of output to the user. Performance analysis device 100 may have one or more input interfaces that use the same or a different input interface technology. The input interface technology further may be accessible by performance analysis device 100 through communication interface 106.

Output interface 104 provides an interface for outputting information for review by a user of performance analysis device 100 and/or for use by another application or device. For example, output interface 104 may interface with various output technologies including, but not limited to, display 116, a speaker 118, a printer 120, etc. Performance analysis device 100 may have one or more output interfaces that use the same or a different output interface technology. The output interface technology further may be accessible by performance analysis device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Performance analysis device 100 may have one or more communication interfaces that use the same or a different communication interface technology. For example, performance analysis device 100 may support communication using an Ethernet port, a Bluetooth antenna, a telephone jack, a USB port, etc. Data and messages may be transferred between performance analysis device 100 and another computing device of distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. performance analysis device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. performance analysis device 100 also may have one or more drives that support the loading of a memory media such as a CD, DVD, an external hard drive, etc. One or more external hard drives further may be connected to performance analysis device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit (GPU), an application-specific integrated circuit (ASIC), a field-programmable gate array (FPGA), an artificial intelligence (AI) accelerator, a purpose-built chip architecture for machine learning, and/or some other machine-learning specific processor that implements a machine learning approach using semiconductor (e.g., silicon (Si), gallium arsenide(GaAs)) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency response variables and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Performance analysis device 100 may include a plurality of processors that use the same or a different processing technology.

Performance analysis application 122 performs operations associated with defining model description data 128 from data stored in training dataset 124 and with allowing the user of performance analysis device 100 to interactively select clusters of cluster dataset 126 for further analysis. Model description data 128 may be used to predict a response variable value from observations in training dataset 124 that are stored in predicted output dataset 130. Some or all of the operations described herein may be embodied in performance analysis application 122. The operations may be implemented using hardware, firmware, software, or any combination of these methods.

Performance analysis application 122 is easy to use and provides approximately instantaneous feedback so that the user can quickly and efficiently identify observation vectors of training dataset 124 on which a model instantiated based on model description data 128 performs poorly. Once the observation vectors are selected, performance analysis application 122 provides automatic or interactive model improvements.

Referring to the example embodiment of FIG. 1, performance analysis application 122 is implemented in software (comprised of computer-readable and/or computer-executable instructions) stored in computer-readable medium 108 and accessible by processor 110 for execution of the instructions that embody the operations of performance analysis application 122. Performance analysis application 122 may be written using one or more programming languages, assembly languages, scripting languages, etc. Performance analysis application 122 may be integrated with other analytic tools. As an example, performance analysis application 122 may be part of an integrated data analytics software application and/or software architecture such as that offered by SAS Institute Inc. of Cary, N.C., USA. Merely for illustration, performance analysis application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Performance analysis application 122 may be implemented as a Web application. For example, performance analysis application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables may include a response variable Y and one or more explanatory variables that define an explanatory vector X for each observation vector. Training dataset 124 may include additional variables that are not either the response variable Y or one of the explanatory variables. An observation vector is defined as $(y_i, x_i)$ that may include a value for each of the response variable Y and the explanatory variables associated with the observation vector i. One or more variables of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing.

Training dataset 124 may be stored on computer-readable medium 108 or on one or more computer-readable media of distributed computing system 132 and accessed by performance analysis device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on performance analysis device 100 or on distributed computing system 132. performance analysis device 100 may coordinate access to training dataset 124 that is distributed across distributed computing system 132 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 2A:
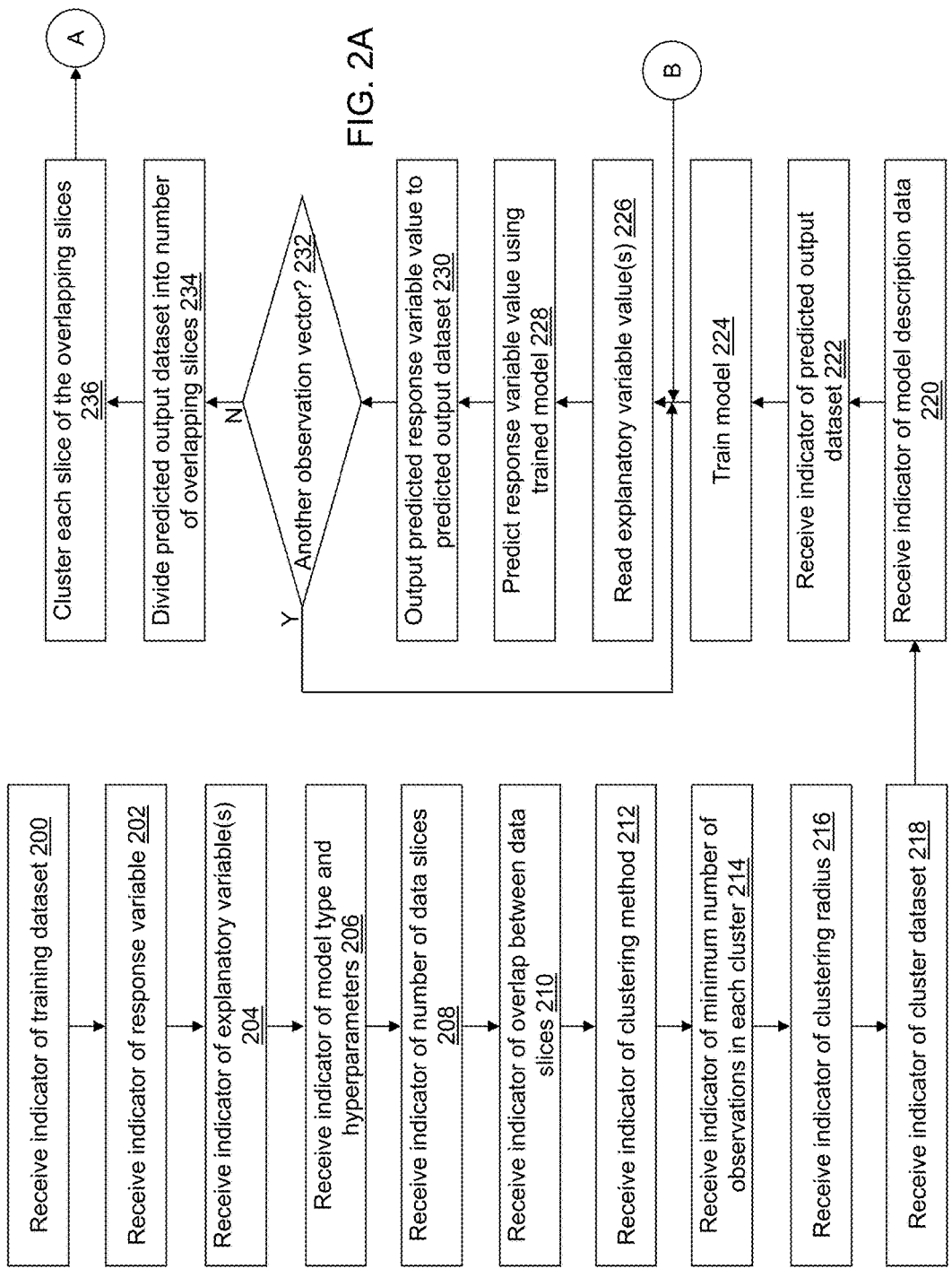
FIGS. 2A and 2B depict a flow diagram illustrating examples of operations performed by a performance analysis application of the performance analysis device of FIG. 1 in accordance with an illustrative embodiment.
Figure 2B:
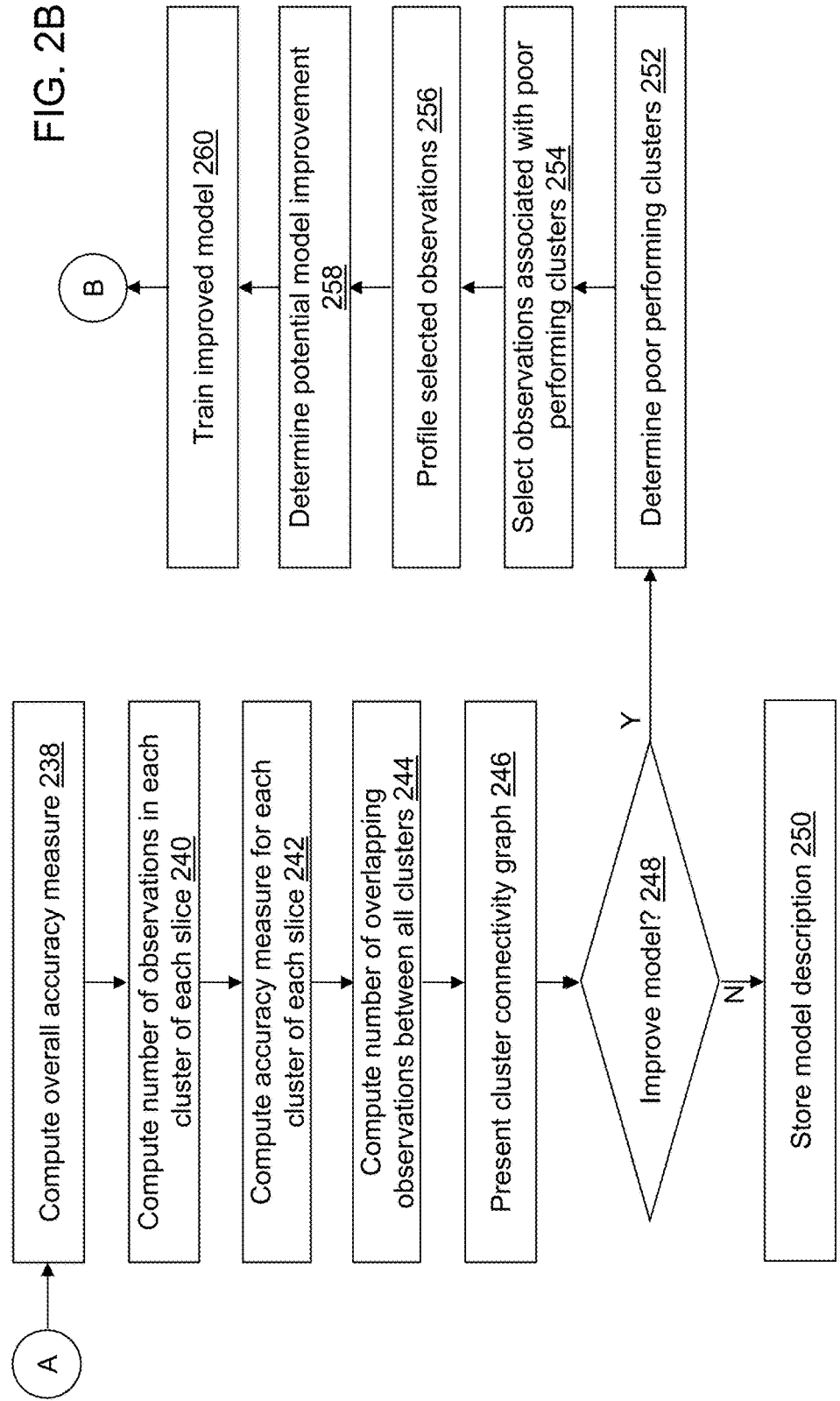

Referring to FIGS. 2A and 2B, example operations associated with performance analysis application 122 are described. Additional, fewer, or different operations may be performed depending on the embodiment of performance analysis application 122. The order of presentation of the operations of FIGS. 2A and 2B is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated. For example, a user may execute performance analysis application 122, which causes presentation of a first user interface window, which may include a plurality of menus and selectors such as drop-down menus, buttons, text boxes, hyperlinks, etc. associated with performance analysis application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by performance analysis application 122.

In an operation 200, a first indicator may be received that indicates training dataset 124. For example, the first indicator indicates a location and a name of training dataset 124. As an example, the first indicator may be received by performance analysis application 122 after selection from a user interface window or after entry by a user into a user interface window. In an alternative embodiment, training dataset 124 may not be selectable. For example, a most recently created dataset may be used automatically.

In an operation 202, a second indicator may be received that indicates response variable Y in training dataset 124. For example, the second indicator may indicate a column number or a column name. As another option, a first or a last column of training dataset 124 may be assumed to be the response variable Y column.

In an operation 204, a third indicator may be received that indicates one or more explanatory variables X in training dataset 124. For example, the third indicator may indicate one or more column numbers or one or more column names.

As another option, a first or a last column of training dataset 124 may be assumed to be the explanatory variable X column. As understood by a person of skill in the art, when the third indicator indicates a plurality of explanatory variables, X defines an explanatory variable vector. Response variable Y represents a truth value associated with the one or more explanatory variables X. For example, response variable Y indicates a true classification or a true predicted value or characteristic.

In an operation 206, a fourth indicator of a model type and associated hyperparameters may be received. For example, the fourth indicator indicates a name of a model type. The selected model type is a two-way classifier that models a behavior Y given explanatory variable X from training dataset 124. Once trained, the selected model type assigns a scalar value to values of the explanatory variable X. A threshold is used to determine an assigned category for the behavior Y. For example, if the computed scalar value is greater than the threshold, Y=A; otherwise, Y=B.

The second indicator may be received by performance analysis application 122 after selection from a user interface window or after entry by a user into a user interface window. As an example, a model type may be selected from "Decision Tree", "Factorization Machine", "Forest", "Gradient Boosting Tree", "Neural Network", "Support Vector Machine", etc. Of course, the model type may be labeled or selected in a variety of different manners by the user as understood by a person of skill in the art. In an alternative embodiment, the model type may not be selectable, and a single model type is implemented in performance analysis application 122.

The Decision Tree model type automatically adjusts decision tree hyperparameters to tune a decision tree model for minimum error as measured by a specified objective function. For illustration, a tuneDecisionTree action selects different hyperparameter configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecisionTree action, the dtreeTrain action, the dtreePrune action, and the dtreeScore action are included in SAS® Viya™ and SAS® Cloud Analytic Services (CAS) developed and provided by SAS Institute Inc. of Cary, N.C., USA.

The Forest model type automatically adjusts forest hyperparameters to tune a Forest model for minimum error as measured by a specified objective function. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the response variable. These estimates are subsequently applied to predict the response variable of a new observation that is assigned to the leaf.

For illustration, a FOREST procedure included in SAS® Visual Data Mining and Machine Learning 8.1 may be used to implement the forest model type in SAS® Viya™ developed and provided by SAS Institute Inc. of Cary, N.C., USA. The FOREST procedure creates a predictive model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the response variable, when it forms a splitting rule. The FOREST procedure creates an ensemble of decision trees to predict a single response variable of either interval or nominal measurement level. An input variable can have an interval or nominal measurement level.

For illustration, an "autotune" statement used with the FOREST procedure included in SAS® Visual Data Mining and Machine Learning 8.1 may be used to evaluate different hyperparameter configurations and to select the best configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® Cloud Analytic Services (CAS) developed and provided by SAS Institute Inc. of Cary, N.C., USA.

The Factorization Machine model type automatically adjusts factorization machine parameters to tune a factorization machine model for minimum error as measured by a specified objective function. For illustration, a FACTMAC procedure included in SAS® Visual Data Mining and Machine Learning 8.1 may be used to implement the factorization machine model type in SAS® Viya™ all developed and provided by SAS Institute Inc. of Cary, N.C., USA. The Factorization Machine model type generalizes a matrix factorization. The FACTMAC procedure estimates factors for each of the nominal input variables specified, in addition to estimating a global bias and a bias for each level of the nominal input variables. An interval response variable is also specified. The FACTMAC procedure computes the biases and factors by using a stochastic gradient descent (SGD) algorithm that minimizes a root mean square error (RMSE) criterion.

For illustration, an "autotune" statement used with the FACTMAC procedure included in SAS® Visual Data Mining and Machine Learning 8.1 may be used to evaluate different hyperparameter configurations and to select the best configuration of hyperparameter values for the Forest model type. A tuneFactmac action selects different hyperparameter configurations to run the factmac action of the factmac action set, the score action of the astore action set, and the assess action of the percentile action set to train and validate factorization machine models as it searches for a model that has reduced validation error. For illustration, the factmac action, the score action, and the assess action are included in SAS® Viya™ and SAS® Cloud Analytic Services (CAS) developed and provided by SAS Institute Inc. of Cary, N.C., USA.

The Gradient Boosting Tree model type automatically adjusts gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.1 may be used to implement the Gradient Boosting Tree model type in SAS® Viya™ all developed and provided by SAS Institute Inc. of Cary, N.C., USA. The GRADBOOST procedure creates a predictive model called a gradient boosting tree model in SAS Viya. The GRADBOOST procedure creates a predictive model by fitting a set of additive trees.

For illustration, an "autotune" statement used with the GRADBOOST procedure included in SAS® Visual Data Mining and Machine Learning 8.1 may be used to evaluate different hyperparameter configurations and to select the best configuration of hyperparameter values for the Forest model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decision Tree action set of SAS® Viya™ and SAS® Cloud Analytic Services (CAS) developed and provided by SAS Institute Inc. of Cary, N.C., USA.

The Neural Network model type automatically adjusts neural network parameters to tune a neural network model for minimum error as measured by a specified objective function. For illustration, a NNET procedure included in SAS® Visual Data Mining and Machine Learning 8.1 may be used to implement the Neural Network model type in SAS® Viya™ all developed and provided by SAS Institute Inc. of Cary, N.C., USA. The NNET procedure trains a multilayer perceptron neural network. Training a multilayer perceptron neural network relies on an unconstrained minimization of a nonlinear objective function.

For illustration, an "autotune" statement used with the NNET procedure included in SAS® Visual Data Mining and Machine Learning 8.1 may be used to evaluate different hyperparameter configurations and to select the best configuration of hyperparameter values for the neural network model type. A tuneNeuralNet action selects different hyperparameter configurations to run the annTrain and annScore actions multiple times to train and validate neural network models as it searches for a model that has reduced validation error. For illustration, the annTrain and annScore actions are included in the neuralNet action set of SAS® Viya™ and SAS® Cloud Analytic Services (CAS) developed and provided by SAS Institute Inc. of Cary, N.C., USA.

The Support Vector Machine model type automatically adjusts support vector machine parameters to tune a support vector machine model for minimum error as measured by a specified objective function. For illustration, a SVMACHINE procedure included in SAS® Visual Data Mining and Machine Learning 8.1 may be used to implement the Support Vector Machine model type in SAS® Viya™ all developed and provided by SAS Institute Inc. of Cary, N.C., USA. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.1 may be used to evaluate different hyperparameter configurations and to select the best configuration of hyperparameter values for the support vector machine model type. A tuneSvm action selects different hyperparameter configurations to run the svmTrain action of the svm action set, the score action of the astore action set, and the assess action of the percentile action set to train and validate support vector machine models as it searches for a model that has reduced validation error. For illustration, the svmTrain action is included in the svm action set of SAS® Viya™ and SAS® Cloud Analytic Services (CAS) developed and provided by SAS Institute Inc. of Cary, N.C., USA.

As another option, the fourth indicator may include specified values for one or more of the hyperparameters based on the selected model type instead of using a tuning method. For illustration, the decision tree model type hyperparameters may include a maximum number of decision tree levels, a number of bins to use for numeric variables during calculation of the decision tree, and a split criterion for each tree node. The factorization machine model type hyperparameters may include a number of factors, a learning step, and a maximum number of iterations.

The forest model type hyperparameters may include a fraction of a random bootstrap sample of the training data to be used for growing each tree in the forest, where the fraction is a value between 0 and 1. The forest model type hyperparameters further may include a maximum depth of a decision tree to be grown where a number of levels in a tree is equal to a depth value plus one. The forest model type hyperparameters further may include a number of trees to grow. The forest model type hyperparameters further may include a number of input variables to consider splitting on in a node, where the value is between one and a number of input variables.

The gradient boosting tree model type hyperparameters may include an L1 norm regularization parameter that is greater than or equal to zero. The gradient boosting tree model type hyperparameters further may include a learning rate that is between zero and one, inclusive. The gradient boosting tree model type hyperparameters further may include a number of trees to grow. The gradient boosting tree model type hyperparameters further may include an L2 norm regularization parameter that is greater than or equal to zero. The gradient boosting tree model type hyperparameters further may include a fraction of the training data to be used for growing each tree. The gradient boosting tree model type hyperparameters further may include a number of input variables to consider splitting on in a node where the value is between one and a number of input variables.

The neural network model type hyperparameters may include a range of an annealing rate to use when a stochastic gradient descent (SGD) algorithm is used for training. The neural network model type hyperparameters further may include a learning rate when the SGD algorithm is used for training. The neural network model type hyperparameters further may include a number of hidden layers in the network. The neural network model type hyperparameters further may include tuning information for neurons in the ith hidden layer, where i is any integer between one and the number of hidden layers, inclusive. The neural network model type hyperparameters further may include an L1 norm regularization parameter that is greater than or equal to zero. The neural network model type hyperparameters further may include an L2 norm regularization parameter that is greater than or equal to zero.

The support vector machine model type hyperparameters may include a penalty value that is greater than zero. The support vector machine model type hyperparameters further may include a degree value that can be between one and three, inclusive. The degree value equal to one is used in a linear kernel. The degree value equal to two or three is used in a polynomial kernel.

The fourth indicator further may include an indicator of values for one or more optimization parameters used to determine when training/tuning of the model type is complete. For example, a maximum number of configuration evaluations, a maximum number of iterations, a maximum time, and/or a maximum number of configurations to evaluate in a single iteration may be defined by the fourth indicator.

The fourth indicator further may include an indicator of an objective function. For example, the fourth indicator indicates a name of an objective function. The objective function specifies a measure of model error (performance). A default value for the objective function may further be stored, for example, in computer-readable medium 108. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", etc. Some values can be specified only when the response variable is of a particular type. For example, a default objective function may be the "MISC" objective function for nominal type response variables or "MSE" for interval type response variables. Of course, the objective function may be labeled or selected in a variety of different manners by the user as understood by a person of skill in the art. In an alternative embodiment, the objective function may not be selectable, and a single objective function is implemented in performance analysis application 122. For example, the MISC" objective function may be used by default or without allowing a selection for nominal type response variables and "MSE" may be used by default or without allowing a selection for interval type response variables.

ASE uses an average squared error as the objective function; AUC uses an area under a curve as the objective function; F05 uses a F0.5 coefficient as the objective function; F1 uses an F1 coefficient as the objective function; GAMMA uses a gamma coefficient as the objective function; GINI uses a Gini coefficient as the objective function; KS uses a Kolmogorov-Smirnov coefficient as the objective function; MAE uses a mean absolute error as the objective function; MCE uses a misclassification rate as the objective function; MCLL uses a multiclass log loss as the objective function; MISC uses a misclassification error percentage as the objective function; MSE uses a mean squared error as the objective function; MSLE uses a mean squared logarithmic error as the objective function; RASE uses a root average squared error as the objective function; RMAE uses a root mean absolute error as the objective function; RMSLE uses a root mean squared logarithmic error as the objective function; and TAU uses a tau coefficient as the objective function.

The following notation is used to provide a discussion of fit statistics for illustrative objective functions:
$n_o$ is a number of observations,
r is a number of levels for a nominal response variable,
N is a sum of observation frequencies in the data,
$\omega_i$ is a frequency of observation i, so $N=\Sigma_{i=1}^{n_o}\omega_i$,
$y_i$ is a response variable value of observation i,
$\hat{y}_i$ is a predicted response variable value of observation i,
m is a number of response variable levels,
$t_i$ is a level from the response variable in observation i,
$\hat{t}_i$ is a predicted level from the response variable in observation i,
$y_{i,j}=1$ if observation i is assigned to response variable level j, otherwise $y_{i,j}=0$,
$p_{i,j}$ is a predicted probability that observation i is assigned to response variable level j,
$m_{tc}$ is a number of total cutoff points,
$a_k$ is a true positive at cutoff point k,
$b_k$ is a false positive at cutoff point k,
$c_k$ is a false negative at cutoff point k, $\theta = \sum_{k=1}^{m_{tc}}(a_{k-1}-a_k)(b_{k-1}-b_k)$,
$\mu = \sum_{k=2}^{m_{tc}}((a_{k-1}-a_k)\sum_{j=1}^{k}(b_{j-1}-b_j))$,
$w = \sum_{k=1}^{m_{tc}}((a_{k-1}-a_k)\sum_{j=k+1}^{m_{tc}}(b_{j-1}-b_j))$,
$\rho = a_0 b_0$,
$a_{m_{tc}} = 0$,
$b_{m_{tc}} = 0$,
$p = a_k/(a_k+b_k)$,
$q = a_k/(a_k+c_k)$, and
$\beta = 0.5$.

For interval response variables, the objective functions may be defined as:

$$ASE = \frac{1}{N}\sum_{i=1}^{n_o}\omega_i(y_i - \hat{y}_i)^2,$$

$$RASE = \sqrt{MSE},$$

$$MSLE = \frac{1}{N}\sum_{i=1}^{n_o}\omega_i(\log(\hat{y}_i+1) - \log(y_i+1))^2,$$

$$RMSLE = \sqrt{MSLE},$$

$$MAE = \frac{1}{N}\sum_{i=1}^{n_o}\omega_i|y_i - \hat{y}_i|,$$

and
$RMAE = \sqrt{MAE}$.

For nominal response variables, the objective functions may be defined as:

$$ASE = \frac{1}{rN}\sum_{i=1}^{n_o}\sum_{j=1}^{m}\omega_i(y_{i,j} - p_{i,j})^2,$$

$$RASE = \sqrt{ASE},$$

$$MCE = \frac{1}{N}\sum_{t_i \neq \hat{t}_i}\omega_i, \text{ and}$$

$$MCLL = -\frac{1}{N}\sum_{i=1}^{n_o}\sum_{j=1}^{m}\omega_i y_{i,j}\log p_{i,j}.$$

Additional objective functions may be defined as:

$$AUC = \frac{\mu + \theta/2}{\rho},$$

$$GINI = \frac{\mu - w}{\rho},$$

$$GAMMA = \frac{\mu - w}{\mu + w},$$

$$TAU = \frac{\mu - w}{N/2(N-1)}, \text{ and}$$

$$F05 = \frac{(1+\beta^2)pq}{\beta^2 p + q}.$$

In an operation 208, a fifth indicator of a number of data slices into which to subdivide training dataset 124 may be received. In an alternative embodiment, the fifth indicator may not be received. For example, a default value may be stored, for example, in computer-readable medium 108 and used automatically. In another alternative embodiment, the number of data slices may not be selectable. Instead, a fixed, predefined value may be used. For illustration, a default value of the number of data slices may be twenty.

In an operation 210, a sixth indicator of a percentage overlap between data slices may be received. In an alternative embodiment, the sixth indicator may not be received. For example, a default value may be stored, for example, in computer-readable medium 108 and used automatically. In another alternative embodiment, the percentage overlap may not be selectable. Instead, a fixed, predefined value may be used. For illustration, a default value of the percentage overlap may be 20%.

In an operation 212, a seventh indicator of a clustering algorithm to execute to cluster the data is received. For example, the seventh indicator indicates a name of a clustering algorithm. The seventh indicator may be received by performance analysis application 122 after selection from a user interface window or after entry by a user into a user interface window. A default value for the clustering algorithm to execute may further be stored, for example, in computer-readable medium 108. In an alternative embodiment, the clustering algorithm may not be selectable. Example clustering algorithms include the k-means algorithm, Ward's minimum-variance algorithm, a hierarchical algorithm, a median algorithm, McQuitty's similarity analysis algorithm, or other algorithms based on minimizing a cluster residual sum of squares as understood by a person of skill in the art. The seventh indicator may further include a value for zero or more hyperparameters associated with the indicated clustering algorithm.

In an operation 214, an eighth indicator of a minimum number of observations in each cluster may be received. In an alternative embodiment, the eighth indicator may not be received. For example, a default value may be stored, for example, in computer-readable medium 108 and used automatically. In another alternative embodiment, the minimum number of observations may not be selectable. Instead, a fixed, predefined value may be used. For illustration, a default value of the minimum number of observations may be 20. Alternatively, the minimum number of observations may be included with the seventh indicator.

In an operation 216, a ninth indicator of a clustering radius may be received. In an alternative embodiment, the ninth indicator may not be received. For example, a default value may be stored, for example, in computer-readable medium 108 and used automatically. In another alternative embodiment, the clustering radius may not be selectable. Instead, a fixed, predefined value may be used. For illustration, a default value of the clustering radius may be 0.04. Alternatively, the clustering radius may be included with the seventh indicator.

In an operation 218, a tenth indicator may be received that indicates cluster dataset 126. For example, the tenth indicator indicates a location and a name of cluster dataset 126. As an example, the tenth indicator may be received by performance analysis application 122 after selection from a user interface window or after entry by a user into a user interface window. In an alternative embodiment, cluster dataset 126 may not be selectable and a default location and name for storing cluster dataset 126 is used. Cluster data further, or in the alternative, may be stored in RAM.

In an operation 220, an eleventh indicator may be received that indicates model description data 128. For example, the eleventh indicator indicates a location and a name of model description data 128. As an example, the eleventh indicator may be received by performance analysis application 122 after selection from a user interface window or after entry by a user into a user interface window. In an alternative embodiment, model description data 128 may not be selectable and a default location and name for storing model description data 128 is used. Model description data further, or in the alternative, may be stored in RAM.

In an operation 222, a twelfth indicator may be received that indicates predicted output dataset 130. For example, the twelfth indicator indicates a location and a name of predicted output dataset 130. As an example, the twelfth indicator may be received by performance analysis application 122 after selection from a user interface window or after entry by a user into a user interface window. In an alternative embodiment, predicted output dataset 130 may not be selectable and a default location and name for storing predicted output dataset 130 is used. Predicted output data further, or in the alternative, may be stored in RAM.

In an operation 224, a model is trained using each observation vector read from training dataset 124 based on the model type and hyperparameters selected in operation 206.

In an operation 226, a value(s) x for the explanatory variable X is/are read from a next line of training dataset 124. In an alternative embodiment, a validation dataset with distinct observations relative to training dataset 124 may be read instead.

In an operation 228, a value y for the response variable Y is predicted using the trained model and the read value(s) x. Alternatively, or in addition, depending on the model type of the trained model, a probability that the value(s) x for the explanatory variable X are the response variable Y is predicted.

In an operation 230, the predicted value is output to predicted output dataset 130. The value x and/or other values read from input dataset further may be output to predicted output dataset 130.

In an operation 232, a determination is made concerning whether there is another observation vector to process. When there is another observation vector to process, processing continues in operation 226. When there is not another observation vector to process, processing continues in an operation 234.

In operation 234, the predicted output is divided into the number of data slices indicated in operation 208 with the percentage overlap indicated in operation 210. For example, the slices may be constructed by sorting values of the response variable Y in descending order and splitting based on the percentage overlap between data slices into the number of data slices. In an alternative embodiment, the sorting may be performed in ascending order.

In an operation 236, each data slice is clustered based on the predicted value output in operation 230 using each observation vector assigned to the data slice based on the clustering method selected in operation 212, the minimum number of observations in each cluster indicated in operation 214, and the clustering radius indicated in operation 216. As a result, a set of one or more clusters is defined for each data slice. For some model types, multiple sets of clusters may be defined for each data slice. For example, a set of one or more clusters may be defined for each level or layer of a neural network and for each data slice. For illustration, SAS procedures such as PROC KCLUS, PROC HPCLUS, PROC DBSCAN, PROC FASTCLUS, PROC CLUSTER, etc. may be used to cluster each data slice using the clustering method selected in operation 212.

Referring to FIG. 2B, in an operation 238, an overall accuracy measure is computed for all observations based on the predicted output.

In an operation 240, a number of observations included in each cluster defined in operation 236 is computed.

In an operation 242, an accuracy measure is computed based on the objective function indicated for the model type in operation 206 and the predicted output for the observations included in each cluster defined in operation 236. The accuracy measure may be a ratio relative to the computed overall accuracy measure.

In an operation 244, a number of overlapping observations is computed between the observations included in each cluster defined in operation 236.

Figure 3:
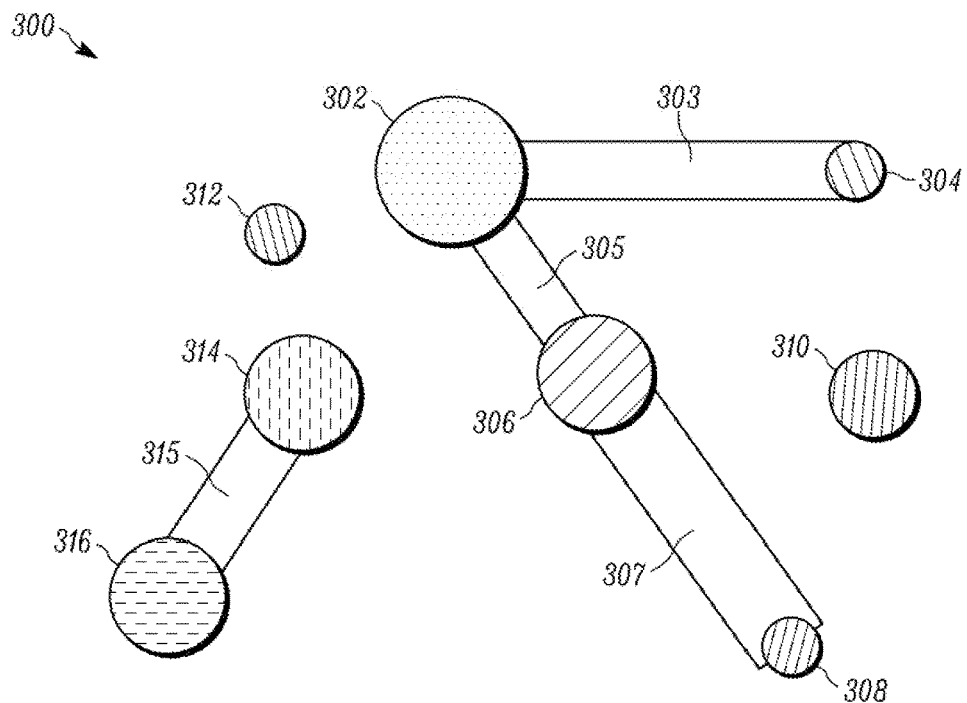
FIGS. 3 to 10, 12 and 14 show a user interface supported by the performance analysis application of FIGS. 2A and 2B and used to interactively improve a model performance and understanding in accordance with an illustrative embodiment.

In an operation 246, a cluster connectivity graph is presented in display 116. For example, referring to FIG. 3, a cluster connectivity graph 300 is presented in a user interface window of performance analysis application 122 on display 116. Cluster connectivity graph 300 includes a node for each cluster for all of the data slices defined in operation 236. When multiple sets of clusters are defined for each data slice, cluster connectivity graph 300 includes a single set of one or more clusters defined for all of the data slices for a common level such as all of the clusters defined for all of the data slices for an ith neural network layer.

A size of each node is based on the computed number of observations included in the respective cluster. For example, the size s may be $s=\log|v_k|$, where $v_k$ is the number of observations included in the $k^{th}$ cluster. A color or a fill-pattern of each node is based on the accuracy measure computed for the respective cluster. For example, accuracy measures between 0 and 100 may transition smoothly between red for a value of 0 and blue for a value of 100. A width of a connector between pairs of nodes is based on the number of overlapping observations. The width may be based on a percentage of overlapping observations. For example, a width of a connector line may range from zero for no overlapping observations between nodes (no connector line) to 100 when all of the observations of one node of a pair of nodes is included in the other node of the pair of nodes. For example, the width w may be $$w = \frac{\min v_i, v_k}{|v_i \cap v_k|},$$

where $v_i$ is the number of observations included in the $i^{th}$ cluster.

For illustration, cluster connectivity graph 300 includes a first node 302 for a first cluster, a second node 304 for a second cluster, a third node 306 for a third cluster, a fourth node 308 for a fourth cluster, a fifth node 310 for a fifth cluster, a sixth node 312 for a sixth cluster, a seventh node 314 for a seventh cluster, and an eighth node 316 for an eighth cluster. The eight clusters shown in cluster connectivity graph 300 includes the clusters defined for all of the data slices combined for a specific level of the model. A first connector line 303 connects first node 302 and second node 304 because the pair of nodes have overlapping observations. A second connector line 305 connects first node 302 and third node 306 because the pair of nodes have overlapping observations. A third connector line 307 connects third node 306 and fourth node 308 because the pair of nodes have overlapping observations. A fourth connector line 315 connects seventh node 314 and eighth node 316 because the pair of nodes have overlapping observations. The non-connected nodes do not include any overlapping observations.

The coloring or fill-pattern of each node that represents a cluster indicates how well the trained model performed on observations included in the cluster. A user can select one or more of the nodes from cluster connectivity graph 300.

In an operation 248, a determination is made concerning whether model improvement is to be performed based on cluster connectivity graph 300. When model improvement is to be performed, processing continues in an operation 252. When model improvement is not to be performed, processing continues in an operation 250. For example, a user may review cluster connectivity graph 300 and determine that none of the nodes shows an unacceptable accuracy measure. As another example, a threshold accuracy measure may be applied to the overall accuracy measure. When the overall accuracy measure is greater than the threshold accuracy measure, no model improvement is deemed to be necessary. As another example, the threshold accuracy measure may be applied to the accuracy measure computed for each the cluster. When the accuracy measure computed for each cluster is greater than the threshold accuracy measure, no model improvement is deemed to be necessary. Otherwise, model improvement may be performed.

In operation 250, parameters that describe the trained model may be stored in computer-readable medium 108 in association with the hyperparameters selected in operation 206, and processing is stopped.

In operation 252, poor performing clusters are determined. For example, the user may manually select clusters by interacting with cluster connectivity graph 300 to select nodes that show a poor accuracy measure. As understood by a person of skill in the art, performance analysis application 122 receives indicators of the user's interactions with the user interface window and responds based on the received indicator. As another example, clusters having an accuracy measure below the threshold accuracy measure may be selected automatically. Poor performing clusters may be determined using various automated procedures such as those provided by SAS procedures such as PROC CLUSTER, PROC KCLUS, PROC DPGMM, etc. Other possibilities include manual inspection of a residual sum of squares plot, a Silhouette criterion, a Calinsky-Harabasz criterion, etc. For illustration, the Silhouette criterion is described in Peter J. Rousseeuw, *Silhouettes: A graphical aid to the interpretation and validation of cluster analysis*, Journal of Computational and Applied Mathematics, Volume 20, 53-65 (1987). For illustration, the Calinsky-Harabasz criterion is described in Caliński, T. and Harabasz, J., *A dendrite method for cluster analysis*, Communications in Statistics-theory and Methods, 3(1), pp. 1-27 (1974).

In an operation 254, observations associated with the determined poor performing clusters are selected. For example, the observations included in each cluster were associated with each cluster in operation 236.

In an operation 256, the selected observations are profiled to identify features that characterize the determined poor performing clusters. For example, the user may request that a variable of the explanatory variable X be examined. For automatic processing, there are multiple possibilities: the LIME algorithm for selecting the most important variables for interpretation (for reference see M. T. Ribeiro, S. Singh, and C. Guestrin, *Why should i trust you?: Explaining the predictions of any classifier*, In Proceedings of the 22nd ACM SIGKDD International Conference on Knowledge Discovery and Data Mining, 1135-1144 (2016)); feature selection using a least absolute shrinkage and selection operator algorithm interpretation; choosing one or more variables that exhibit the most different histogram between the poor performing clusters and the rest of the data, etc.

In an operation 258, a potential model improvement is determined from the profiled observations. For example, the potential model improvement is a decision tree defined based on the features identified in operation 256.

In an operation 260, an improved model is trained using each observation vector read from training dataset 124 based on the model type and hyperparameters selected in operation 206 and the model improvement determined from the profiled observations. Processing continues in operation 226 to determine new values for presentation in an updated cluster connectivity graph 300.

For illustration, training dataset 124 is a credit card default payment dataset that includes data describing credit card holders from a bank in Taiwan. This dataset had a total of approximately 25,000 observations of which 5529 observations were for card holders with default payments. The credit card default payment dataset included 23 original features and 135 derived values for a total of 158 variables. The model type was a feed-forward neural network with seven layers of neurons and with the number of neurons in each layer going from wide to narrow with the last node outputting a scalar value between zero and one, inclusive. The scalar value is the predicted output and indicates a probability of default. The accuracy measure computed for each node was an average misclassification rate. How the representation changes can be examined by looking at each neural network layer separately.

Figure 4:
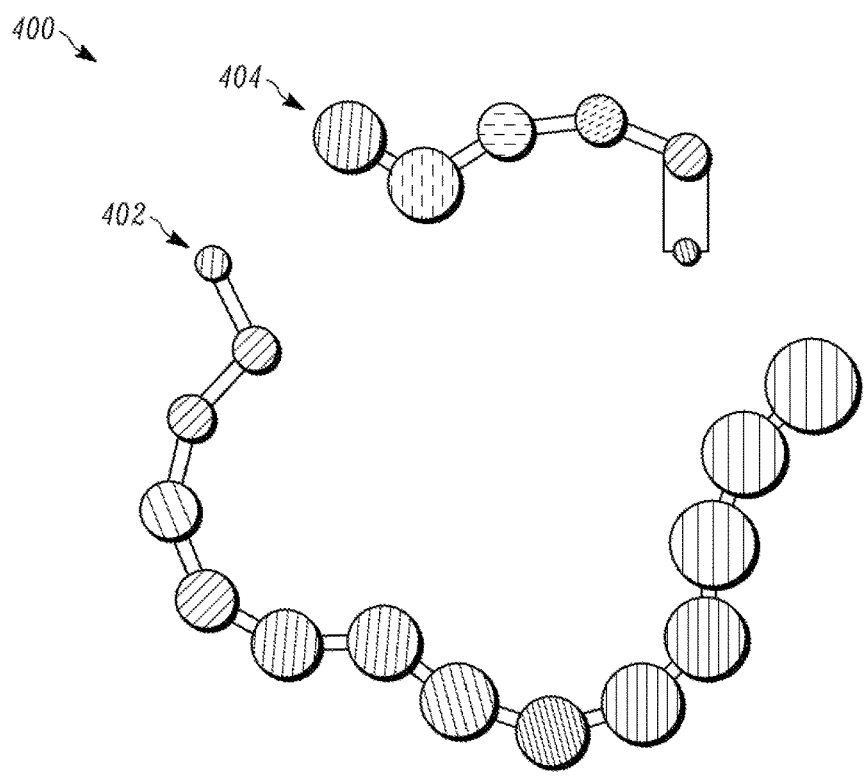

A clustering radius of 0.04 resulted in two distinct groups of nodes as shown referring to FIG. 4. FIG. 4 shows a second cluster connectivity graph 400 that includes a first group 402 of nodes that represent a first group of connected clusters and a second group 404 of nodes that represent a second group of connected clusters. The color represents the average misclassification rate.

Figure 5:
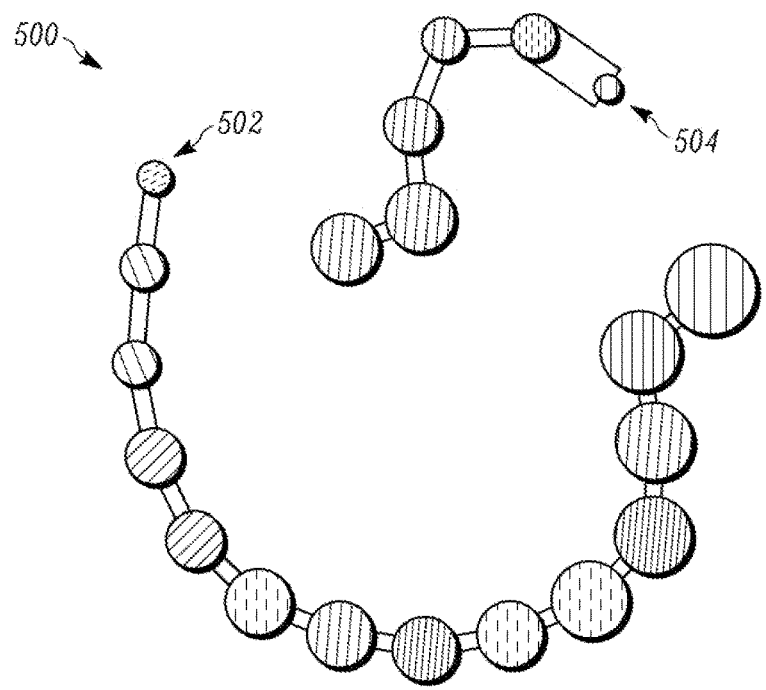

As part of profiling, FIG. 5 shows a third cluster connectivity graph 500 that includes a third group 502 of nodes that represent a third group of connected clusters and a fourth group 504 of nodes that represent a fourth group of connected clusters. The color represents a percentage of the observations in each cluster that are female.

Figure 6:
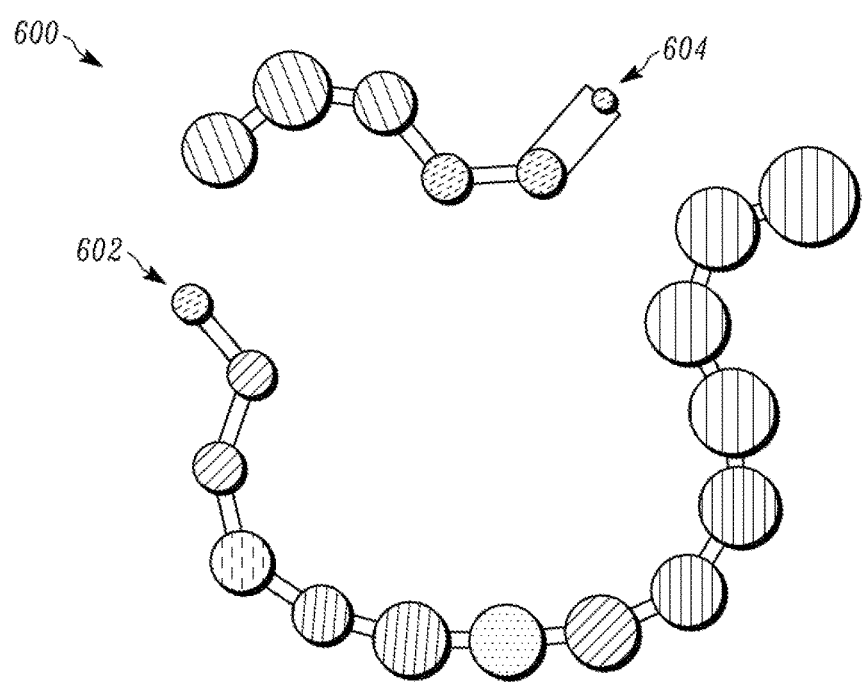

As part of profiling, FIG. 6 shows a fourth cluster connectivity graph 600 that includes a fifth group 602 of nodes that represent a fifth group of connected clusters and a sixth group 604 of nodes that represent a sixth group of connected clusters. The color represents a predicted probability of credit card default in each cluster.

Figure 7:
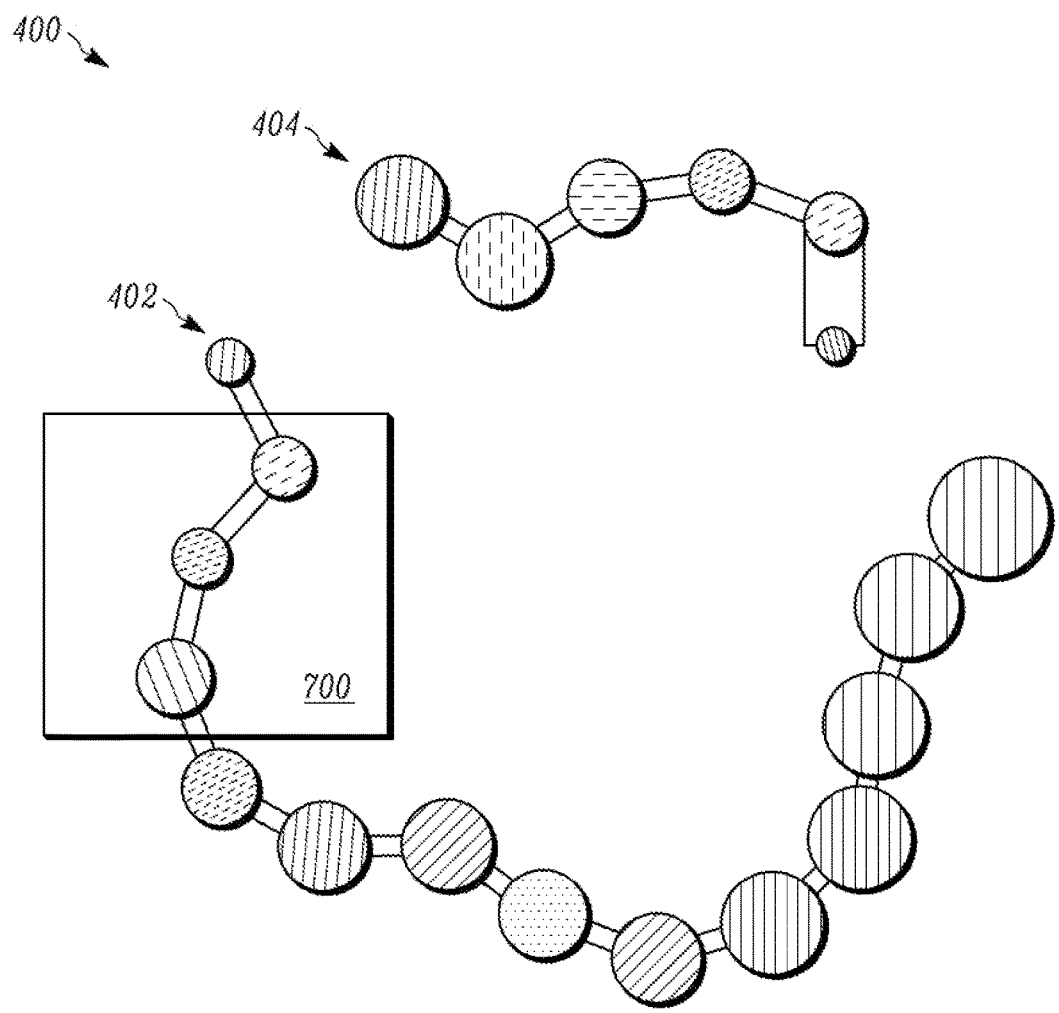

Referring to FIG. 7, as part of selecting poor performing nodes, a poor performing group 700 is selected from first group 402. Second group 404 and remaining nodes of first group 402 are also selected as comparison groups.

Figure 8:
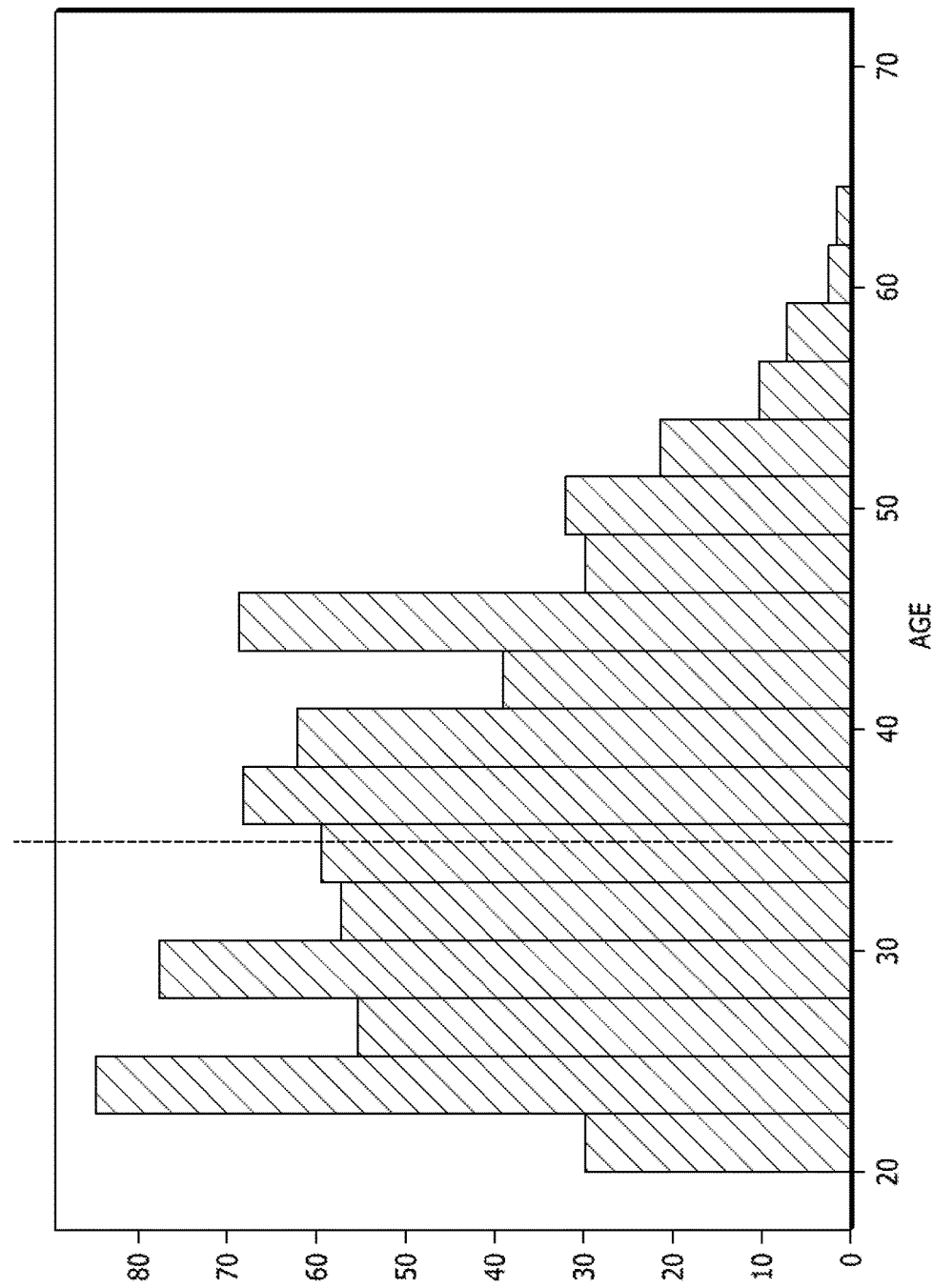
Figure 9:
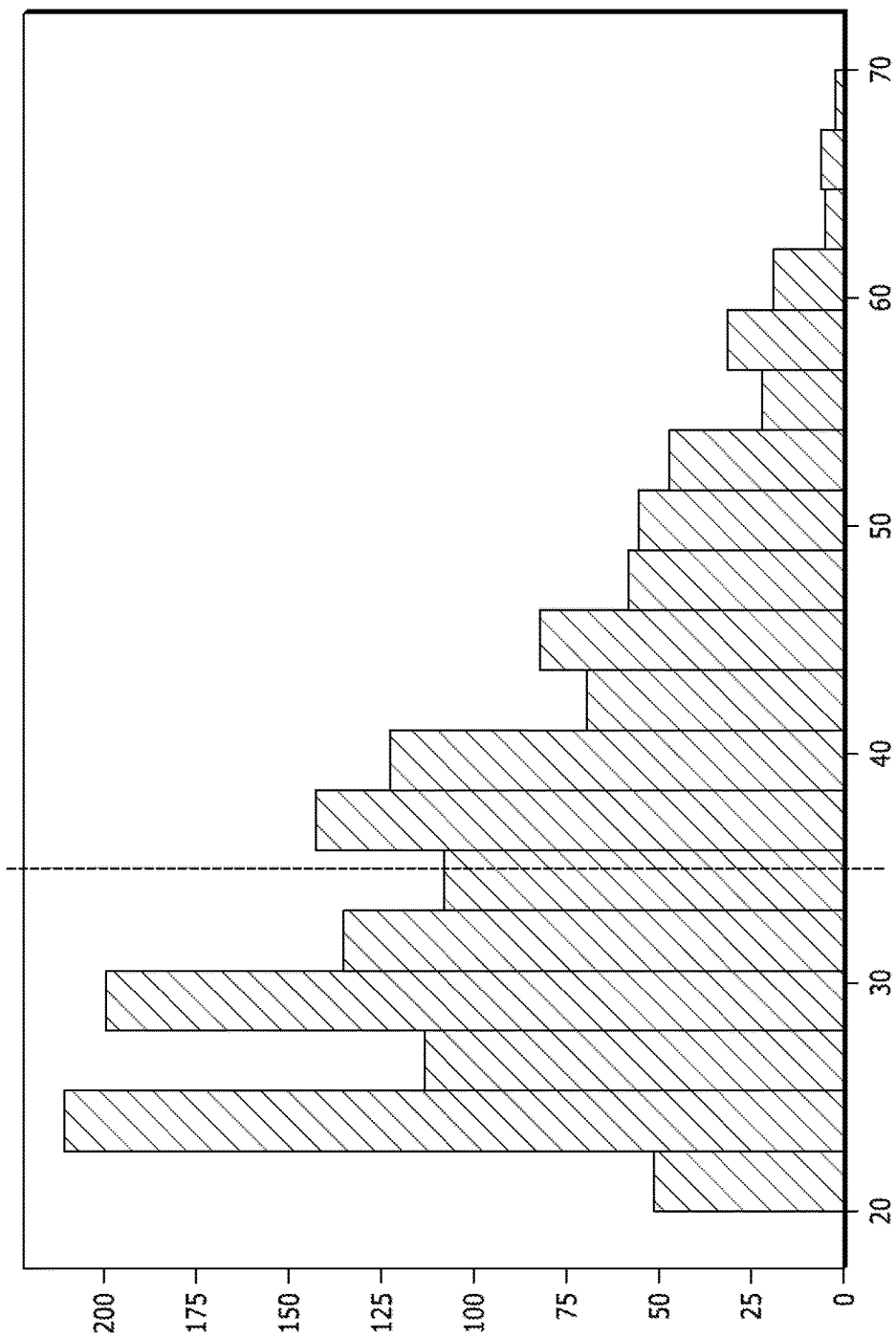
Figure 10:
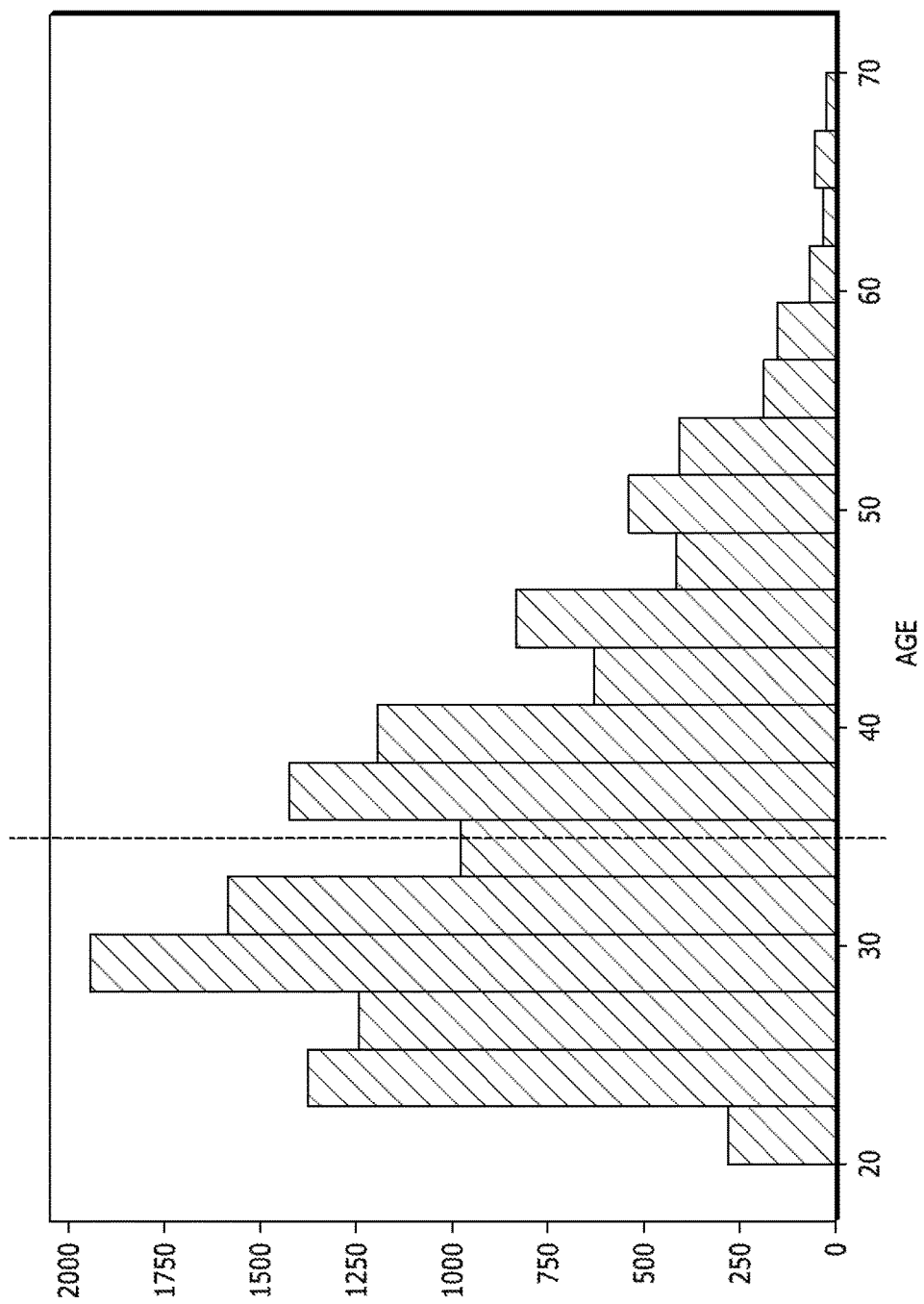

Qualitative analysis of second cluster connectivity graph 400 and profiling of first group 402 and second group 404 suggested that age composition between good and bad regions in the input is slightly different. In the weak performing region, a population above age 35 is larger than an input average, which suggests treating two age groups separately. For example, referring to FIG. 8, an age histogram is shown for poor performing group 700. Referring to FIG. 9, an age histogram is shown for second group 404. Referring to FIG. 10, an age histogram is shown for the remaining nodes of first group 402.

Figure 11:
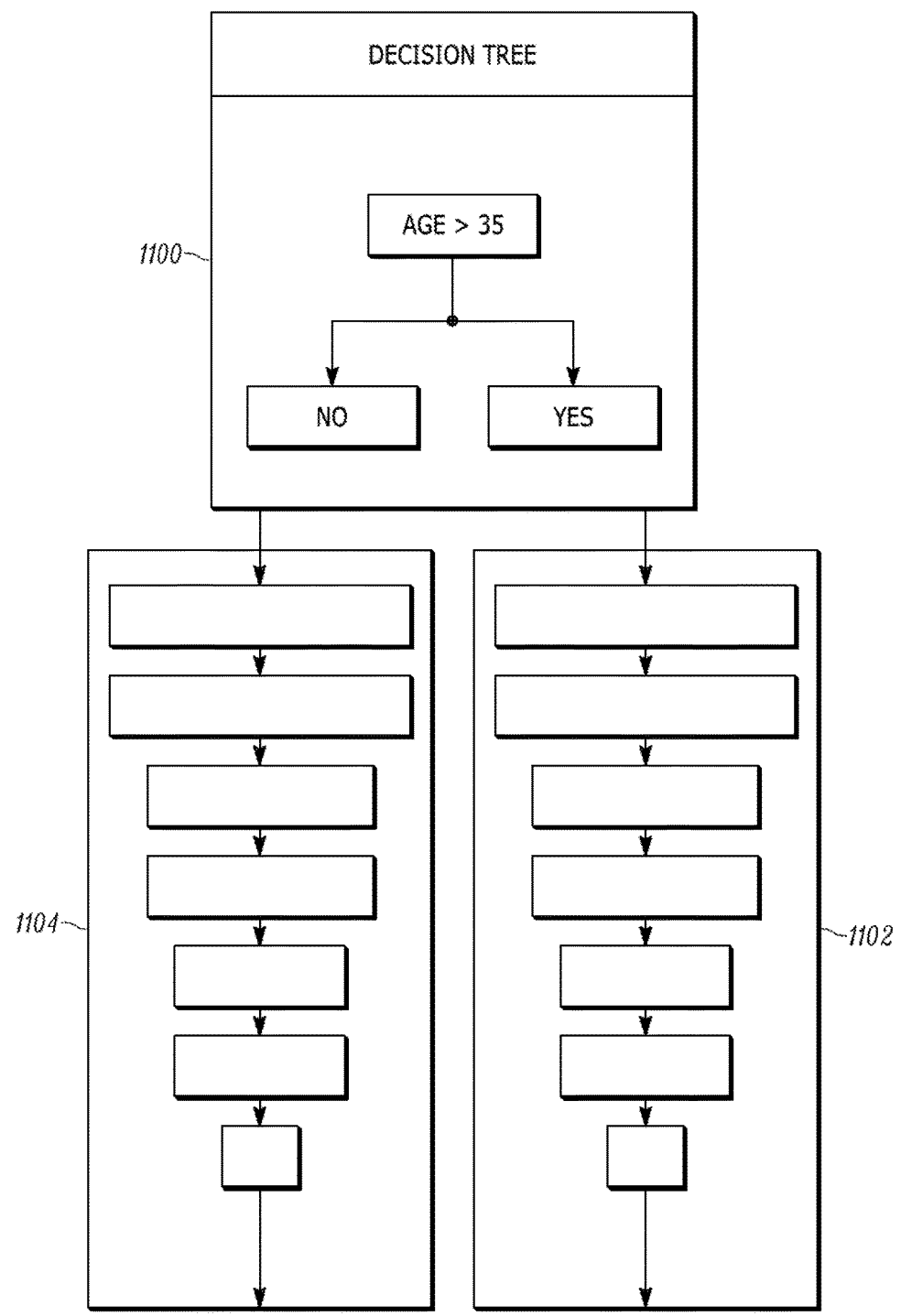
FIG. 11 depicts a first improved model in accordance with an illustrative embodiment.

Referring to FIG. 11, an improved model in operation 258 trains a first neural network 1102 for observations that had an age above 35 and a second neural network 1104 for observations that had an age less than or equal to 35. The improved model includes a decision tree 1100 to split the observations in training dataset 124 based on an age value of the age variable before training.

Figure 12:
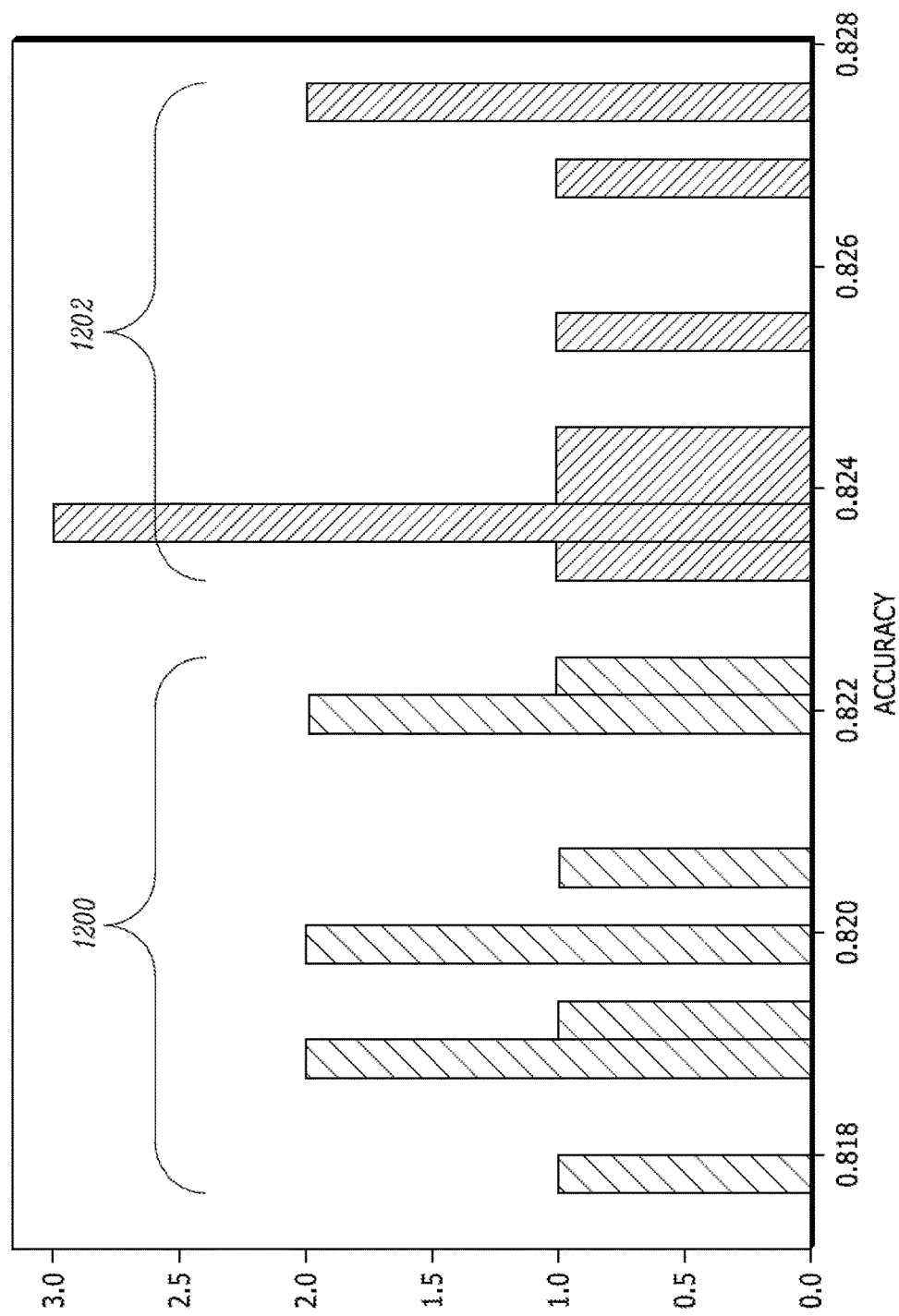

Referring to FIG. 12, an accuracy histogram shows a performance improvement that results using the trained, improved model of FIG. 11. First accuracy bars 1200 represent an accuracy histogram that resulted from the initial trained neural network model. Second accuracy bars 1202 represent a second accuracy histogram that resulted from the trained, improved model of FIG. 11. A distinct accuracy value is shown for 10 total runs.

Figure 13:
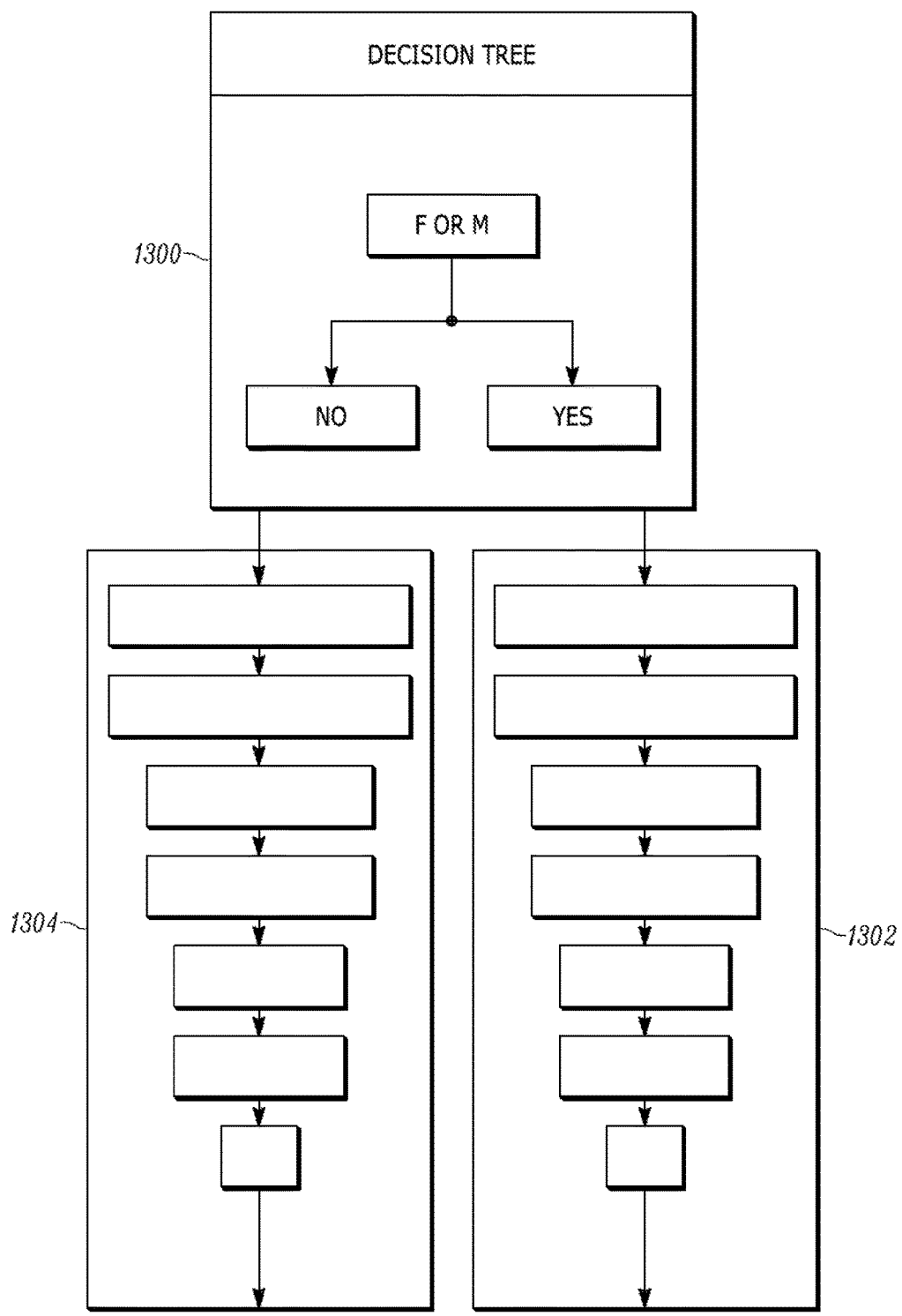
FIG. 13 depicts a second improved model in accordance with an illustrative embodiment.

Third cluster connectivity graph 500 suggested that gender composition between good and bad regions in the input is slightly different. Referring to FIG. 13, an improved model in operation 258 trains a third neural network 1302 for observations that were female and a fourth neural network 1304 for observations that were male. The improved model includes a decision tree 1300 to split the observations in training dataset 124 based on gender before training.

Figure 14:
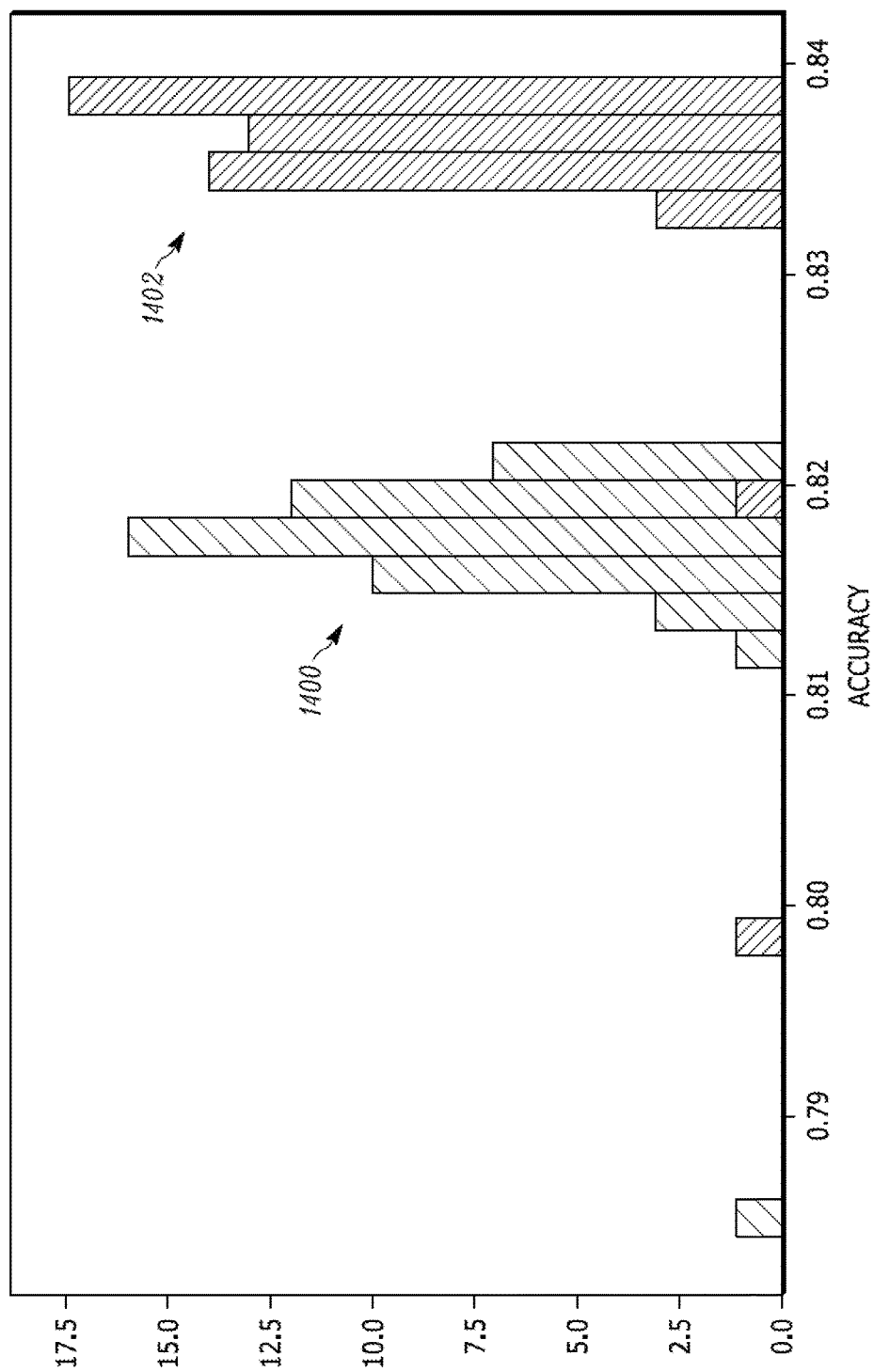

Referring to FIG. 14, an accuracy histogram shows a performance improvement that results using the trained, improved model of FIG. 13. Third accuracy bars 1400 represent a third accuracy histogram that resulted from the initial trained neural network model. Fourth accuracy bars 1402 represent a fourth accuracy histogram that resulted from the trained, improved model of FIG. 13. A distinct accuracy value is shown for 50 total runs.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors, wherein each observation vector of the plurality of observation vectors includes an explanatory variable value for an explanatory variable and a response variable value for a response variable;

train a model using the plurality of observation vectors;

predict a classification value for the response variable for each observation vector of the plurality of observation vectors using a respective explanatory variable value input to the trained model;

divide the plurality of observation vectors into a plurality of overlapping data slices;

separately cluster each data slice of the plurality of overlapping data slices using the predicted classification value to define a set of clusters for the plurality of observation vectors;

compute a number of observations in each cluster of the set of clusters;

compute an accuracy measure for each cluster of the set of clusters based on a comparison between the predicted classification value and a respective response variable value of each observation vector of the plurality of observation vectors;

compute a number of overlapping observations between each pair of clusters of the set of clusters; and present a cluster connectivity graph on a display, wherein the cluster connectivity graph includes a node for each cluster of the set of clusters, wherein a size of each node is determined from the computed number of observations, wherein a fill-pattern of each node is determined from the computed accuracy measure, wherein a connector line between each pair of nodes is determined from the computed number of overlapping observations.

2. The non-transitory computer-readable medium of claim 1, wherein the model is a machine learning model selected from the group consisting of a decision tree model, a factorization machine model, a forest model, a gradient boosting tree model, a neural network model, and a support vector machine model.

3. The non-transitory computer-readable medium of claim 1, wherein the classification value is predicted based on a probability value output from the trained model.

4. The non-transitory computer-readable medium of claim 1, wherein the classification value is predicted based on a probability value output from a layer of the trained model.

5. The non-transitory computer-readable medium of claim 1, wherein dividing the plurality of observation vectors comprises:

sorting the plurality of observation vectors in order based on the response variable value; and splitting the sorted plurality of observation vectors into a predefined number of data slices based on a predefined percentage overlap between data slices.

6. The non-transitory computer-readable medium of claim 5, wherein the predefined percentage overlap is greater than zero.

7. The non-transitory computer-readable medium of claim 1, wherein the accuracy measure is computed based on a predefined objective function that provides a measure of model error.

8. The non-transitory computer-readable medium of claim 1, wherein the computed accuracy measure is a ratio relative to an overall accuracy measure.

9. The non-transitory computer-readable medium of claim 1, wherein a width is defined for each connector line, wherein the width is greater than or equal to zero.

10. The non-transitory computer-readable medium of claim 1, wherein the fill-pattern is a color selected based on the computed accuracy measure for a respective cluster of the node.

11. The non-transitory computer-readable medium of claim 1, wherein the computer-readable instructions further cause the computing device to:
determine a poor performing cluster of the set of clusters based on the computed accuracy measure;
select a subset of observation vectors included in the determined poor performing cluster;
compare the explanatory variable value of the selected subset of observation vectors to the explanatory variable value of the plurality of observation vectors;
determine a model improvement based on the comparison, wherein the model improvement splits the plurality of observation vectors into a first set of observation vectors and a second set of observation vectors based on a split value of the explanatory variable;
train a first model using the first set of observation vectors;
train a second model using the second set of observation vectors; and
output the trained first model, the trained second model, and the split value of the explanatory variable.

12. The non-transitory computer-readable medium of claim 11, wherein the poor performing cluster is determined automatically when the computed accuracy measure is less than a threshold accuracy measure.

13. The non-transitory computer-readable medium of claim 11, wherein the poor performing cluster is determined as a result of an interaction by a user with the presented cluster connectivity graph.

14. The non-transitory computer-readable medium of claim 11, wherein the split value is determined automatically.

15. The non-transitory computer-readable medium of claim 11, wherein the split value is determined based on a presented comparison.

16. A computing device comprising:
a processor; and
a non-transitory computer-readable medium operably coupled to the processor, the computer-readable medium having computer-readable instructions stored thereon that, when executed by the processor, cause the computing device to
read a dataset that includes a plurality of observation vectors, wherein each observation vector of the plurality of observation vectors includes an explanatory variable value for an explanatory variable and a response variable value for a response variable;
train a model using the plurality of observation vectors;
predict a classification value for the response variable for each observation vector of the plurality of observation vectors using a respective explanatory variable value input to the trained model;
divide the plurality of observation vectors into a plurality of overlapping data slices;
separately cluster each data slice of the plurality of overlapping data slices using the predicted classification value to define a set of clusters for the plurality of observation vectors;
compute a number of observations in each cluster of the set of clusters;
compute an accuracy measure for each cluster of the set of clusters based on a comparison between the predicted classification value and a respective response variable value of each observation vector of the plurality of observation vectors;
compute a number of overlapping observations between each pair of clusters of the set of clusters; and
present a cluster connectivity graph on a display, wherein the cluster connectivity graph includes a node for each cluster of the set of clusters, wherein a size of each node is determined from the computed number of observations, wherein a fill-pattern of each node is determined from the computed accuracy measure, wherein a connector line between each pair of nodes is determined from the computed number of overlapping observations.

17. A method provides a visualization that summarizes a performance of a machine learning model to support model improvement and understanding, the method comprising:
reading, by a computing device, a dataset that includes a plurality of observation vectors, wherein each observation vector of the plurality of observation vectors includes an explanatory variable value for an explanatory variable and a response variable value for a response variable;
training, by the computing device, a model using the plurality of observation vectors;
predicting, by the computing device, a classification value for the response variable for each observation vector of the plurality of observation vectors using a respective explanatory variable value input to the trained model;
dividing, by the computing device, the plurality of observation vectors into a plurality of overlapping data slices;
separately clustering, by the computing device, each data slice of the plurality of overlapping data slices using the predicted classification value to define a set of clusters for the plurality of observation vectors;
computing, by the computing device, a number of observations in each cluster of the set of clusters;
computing, by the computing device, an accuracy measure for each cluster of the set of clusters based on a comparison between the predicted classification value and a respective response variable value of each observation vector of the plurality of observation vectors;
computing, by the computing device, a number of overlapping observations between each pair of clusters of the set of clusters; and
presenting, by the computing device, a cluster connectivity graph on a display, wherein the cluster connectivity graph includes a node for each cluster of the set of clusters, wherein a size of each node is determined from the computed number of observations, wherein a fill-pattern of each node is determined from the computed accuracy measure, wherein a connector line between each pair of nodes is determined from the computed number of overlapping observations.

18. The method of claim 17, wherein the model is a machine learning model selected from the group consisting of a decision tree model, a factorization machine model, a forest model, a gradient boosting tree model, a neural network model, and a support vector machine model.

19. The method of claim 17, wherein the classification value is predicted based on a probability value output from the trained model.

20. The method of claim 17, wherein the classification value is predicted based on a probability value output from a layer of the trained model.

21. The method of claim 17, wherein dividing the plurality of observation vectors comprises:

sorting, by the computing device, the plurality of observation vectors in order based on the response variable value; and splitting, by the computing device, the sorted plurality of observation vectors into a predefined number of data slices based on a predefined percentage overlap between data slices.

22. The method of claim 21, wherein the predefined percentage overlap is greater than zero.

23. The method of claim 17, wherein the accuracy measure is computed based on a predefined objective function that provides a measure of model error.

24. The method of claim 17, wherein the computed accuracy measure is a ratio relative to an overall accuracy measure.

25. The method of claim 17, wherein a width is defined for each connector line, wherein the width is greater than or equal to zero.

26. The method of claim 17, wherein the fill-pattern is a color selected based on the computed accuracy measure for a respective cluster of the node.

27. The method of claim 17, further comprising:

determining, by the computing device, a poor performing cluster of the set of clusters based on the computed accuracy measure;

selecting, by the computing device, a subset of observation vectors included in the determined poor performing cluster;

comparing, by the computing device, the explanatory variable value of the selected subset of observation vectors to the explanatory variable value of the plurality of observation vectors;

determining, by the computing device, a model improvement based on the comparison, wherein the model improvement splits the plurality of observation vectors into a first set of observation vectors and a second set of observation vectors based on a split value of the explanatory variable;

training, by the computing device, a first model using the first set of observation vectors;

training, by the computing device, a second model using the second set of observation vectors; and outputting, by the computing device, the trained first model, the trained second model, and the split value of the explanatory variable.

28. The method of claim 27, wherein the poor performing cluster is determined as a result of an interaction by a user with the presented cluster connectivity graph.

29. The method of claim 27, wherein the poor performing cluster is determined automatically when the computed accuracy measure is less than a threshold accuracy measure.

30. The method of claim 27, wherein the split value is determined automatically.

* * * * *

UNITED STATES PATENT AND TRADEMARK OFFICE
CERTIFICATE OF CORRECTION

PATENT NO. : 10,311,368 B2
APPLICATION NO. : 15/928363
DATED : June 4, 2019
INVENTOR(S) : Namita Dilip Lokare et al.

It is certified that error appears in the above-identified patent and that said Letters Patent is hereby corrected as shown below:

In the Specification

Column 1, Lines 9-12:
Delete the phrase "The present application claims the benefit of 35 U.S.C. § 111(e) to U.S. Provisional Patent Application No. 62/557,657 filed on September 12, 2017, the entire contents of which are hereby incorporated by reference." and replace with --The present application claims the benefit of 35 U.S.C. § 119(e) to U.S. Provisional Patent Application No. 62/557,657 filed on September 12, 2017, the entire contents of which are hereby incorporated by reference.--.

Column 12, Line 53:
Delete the phrase "$N = \sum_{i=1}^{n_o} \omega_i,$" and replace with --$N = \sum_{i=1}^{n_o} \omega_i,$--.

Column 13, Line 1:
Delete the phrase "$\theta = \sum_{k=1}^{m_{tc}}(a_{k-1} - a_k)(b_{k-1} - b_k),$" and replace with --$\theta = \sum_{k=1}^{m_{tc}}(a_{k-1} - a_k)(b_{k-1} - b_k),$--.

Column 13, Line 2:
Delete the phrase "$\mu = \sum_{k=2}^{m_{tc}}((a_{k-1} - a_k)\sum_{j=1}^{k}(b_{j-1} - b_j)),$" and replace with --$\mu = \sum_{k=2}^{m_{tc}}((a_{k-1} - a_k)\sum_{j=1}^{k}(b_{j-1} - b_j)),$--.

Column 13, Line 3:
Delete the phrase "$w = \sum_{k=1}^{m_{tc}}((a_{k-1} - a_k)\sum_{j=k+1}^{m_{tc}}(b_{j-1} - b_j)),$" and replace with --$w = \sum_{k=1}^{m_{tc}}((a_{k-1} - a_k)\sum_{j=k+1}^{m_{tc}}(b_{j-1} - b_j)),$--.

Column 13, Line 17:
Delete the phrase "$RASE = \sqrt{MSE},$" and replace with --$RASE = \sqrt{ASE},$--.

Signed and Sealed this
Tenth Day of September, 2019

Andrei Iancu
*Director of the United States Patent and Trademark Office*